(12) United States Patent
Noda et al.

(10) Patent No.: US 7,184,638 B2
(45) Date of Patent: Feb. 27, 2007

(54) ELECTROMAGNETIC WAVE FREQUENCY FILTER

(75) Inventors: Susumu Noda, Uji (JP); Takashi Asano, Kyoto (JP); Hitomichi Takano, Kadoma (JP)

(73) Assignees: Agency of Industrial Science and Technology, Saitama (JP), .;
Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/540,776

(22) PCT Filed: Dec. 24, 2003

(86) PCT No.: PCT/JP03/16515

§ 371 (c)(1),
(2), (4) Date: Jun. 24, 2005

(87) PCT Pub. No.: WO2004/068205

PCT Pub. Date: Aug. 12, 2004

(65) Prior Publication Data

US 2006/0098918 A1   May 11, 2006

(30) Foreign Application Priority Data

Dec. 26, 2002  (JP) .............................. 2002-378438

(51) Int. Cl.
*G02F 1/295* (2006.01)
*G02B 6/42* (2006.01)
*G02B 6/10* (2006.01)

(52) U.S. Cl. .............................. 385/129; 385/4; 385/8; 385/9; 385/32

(58) Field of Classification Search ................. 385/129
See application file for complete search history.

(56) References Cited

U.S. PATENT DOCUMENTS 6,101,300 A * 8/2000 Fan et al. ...................... 385/27

6,130,969 A * 10/2000 Villeneuve et al. ........... 385/27
6,512,866 B1 * 1/2003 Fan et al. ...................... 385/27

FOREIGN PATENT DOCUMENTS

EP      1 136 853 A1    9/2001

(Continued)

OTHER PUBLICATIONS

Hoshoku et al; "Optical Add/Drop Filter Using an In-plane Hereto Photonic Crystal"; 2002 Nen Shuki Dai 63 Kai Extended Abstracts; the Japan Social of Applied Physics, vol. 3, p. 916, Sep. 24, 2002, 25p-YA-17.

(Continued)

*Primary Examiner*—Frank G. Font
*Assistant Examiner*—Mary El-Shammaa
(74) *Attorney, Agent, or Firm*—Oliff & Berridge, PLC (57) ABSTRACT

The present invention aims to provide an electromagnetic wave frequency filter capable of transmitting an electromagnetic wave having a predetermined frequency between two waveguides with a high level of efficiency. This object is achieved by the following construction: A resonator 15 that resonates with the electromagnetic wave having the predetermined frequency is located between an input waveguide 13 and an output waveguide 14 and close to the two waveguides. The output waveguide 14 is designed so that it extends parallel to the input waveguide 13 within a predetermined section 18 located in proximity to the resonator 15, and its distance from the input waveguide 13 in the other section is larger than that in the predetermined section 18. This construction allows the electromagnetic wave having the predetermined frequency to be transmitted between the input waveguide 13 and the output waveguide 14 via the resonator 15, while preventing the other electromagnetic waves having different frequencies from being transmitted between the input waveguide 13 and the output waveguide 14 outside of the predetermined section 18. The present electromagnetic wave frequency filter can be preferably constructed using a two-dimensional photonic crystal.

17 Claims, 7 Drawing Sheets

FOREIGN PATENT DOCUMENTS

| | | |
|---|---|---|
| JP | A 05-323390 | 12/1993 |
| JP | A 2001-508887 | 7/2001 |
| JP | A 2001-272555 | 10/2001 |
| JP | A 2003-279764 | 10/2003 |
| WO | WO 98/53535 | 11/1997 |
| WO | WO 98/57207 | 12/1998 |
| WO | WO 01/20379 A1 | 3/2001 |
| WO | WO 03/081304 A1 | 10/2003 |

OTHER PUBLICATIONS

Hoshoku et al; "Improvement of Optical Add/Drop Filtering efficiency by using an In-Plane Hetero structure interface"; 2003 Nen Shuki Dai 50 Kai Extended Abstracts; the Japan Social of Applied Physics, vol. 3, p. 1137, Mar. 27, 2003, 29a-YN-4.

Talneau et al; "Photonic-crystal ultrashort bends with improved transmission and low reflection at 1.55 μm"; Applied Physics Letters, vol. 80, No. 4, Jan. 28, 2002, pp. 547-549.

Ntakis et al; "Efficient transmission of 60° photonic-crystal bend by waveguide width tuning"; 2002 IEEE; Nov. 2002, pp. 518-519.

H. Takano et al; "High efficient in-plane type 2D PC add/drop filtering device using reflection at hereto interface"; 2003 Nen Shuki Dai 64 Kai Extended Abstracts; the Japan Social of Applied Physics, vol. 3, p. 951, Aug. 30, 2003, 2a-ZM-9.

M. Tokushima et al; "Photonic crystal line defect waveguide directional coupler"; Electronics Letters; vol. 37, No. 24, Nov. 22, 2001, pp. 1454-1455.

A. Motegi et al., The Japan Society of Applied Physics and Related Societies, Extended Abstracts (The 49th Spring Meeting, 2002), Mar. 27, 2002, p. 1038 (29p-L-4), with translation.

* cited by examiner

RADIUS OF HOLE AT BEND SECTION: r=0.29 (NORMAL)

ELECTROMAGNETIC WAVE FREQUENCY FILTER

TECHNICAL FIELD

The present invention relates to a frequency filter for extracting a ray of light or an electromagnetic wave having a predetermined frequency from a waveguide. The frequency filter is applicable to optical communications or similar technical fields.

BACKGROUND ART

To increase the amount of information that can be transmitted per unit of time, recent optical communications use wavelength division multiplexing, in which plural wavelengths (or frequencies) of light, each carrying a different signal, propagate through a single transmission line. In wavelength division multiplexing, plural wavelengths of light are mixed at the inlet of the transmission line, and the mixture of light is separated into the plural wavelengths of light at the outlet. This process requires an optical multiplexer and an optical demultiplexer, or wavelength filters (or frequency filters).

A type of demultiplexer currently used is an arrayed waveguide grating. An arrayed waveguide grating typically uses a quartz glass optical waveguide. With this construction, it is currently necessary to make the device as large as roughly several square centimeters to adequately decrease the loss of light. Taking into account the above-described situation, research has been conducted on the miniaturization of demultiplexers by using a frequency filter composed of a photonic crystal.

A photonic crystal is a functional material having a periodic distribution of refractive index, which provides a band structure with respect to the energy of light. It is particularly featured in that it has an energy region (called the photonic bandgap) that forbids the propagation of light. Introduction of an appropriate defect into the distribution of refractive index in the photonic crystal will create an energy level (called the defect level) due to the defect within the photonic bandgap. This allows only a specific wavelength of light having an energy corresponding to the defect level to exist within the wavelength range corresponding to the energy levels included in the photonic bandgap. Forming a linear defect in the crystal provides a waveguide that propagates light having a specific frequency, and forming a point-like defect in the crystal provides a resonator that resonates with light having a specific frequency.

The Japanese Unexamined Patent Publication No. 2001-272555, which is called "Patent Document 1" hereinafter, discloses a two-dimensional photonic crystal with cylindrical holes periodically arranged in a triangular lattice pattern to provide a periodical distribution of refractive index, in which a linear zone devoid of cylindrical holes is formed as a waveguide ([0025], FIG. 1) and a point defect is formed in proximity to the waveguide ([0029], FIG. 1). Patent Document 1 also includes the analysis of an embodiment of a point defect that is formed by increasing the diameter of the periodically arranged cylindrical holes. This construction provides a demultiplexer for extracting a ray of light having frequency equal to the resonant frequency of the point defect from the light propagating through the waveguide, and a multiplexer for introducing a ray of light having frequency equal to the resonant frequency of the point defect into the waveguide.

The Japanese Unexamined Patent Publication No. 2003-279764 ("Patent Document 2") discloses a cluster defect created by making defects of two or more pieces of modified refractive index areas adjacent to each other within a plurality of modified refractive index areas forming a periodical distribution of refractive index. The defects of the modified refractive index areas are formed by making the refractive index of the desired part of the modified refractive index areas different from that of the rest of the modified refractive index areas. A defect having a refractive index higher than that of the rest of the modified refractive index areas is called the donor type defect, whereas a defect having a lower refractive index is called the acceptor type defect. The defect disclosed in Patent Document 1, which is created by enlarging the cylindrical hole, is an acceptor type defect, whereas a defect created by not providing the modified refractive index area is a donor type defect. The cluster defect and a point defect created by the absence of a single piece of modified refractive index area are generally called the "point-like defect."

Patent Document 2 also discloses a two-dimensional photonic crystal having an in-plane heterostructure provided with plural forbidden band regions, each of which has modified refractive index areas distributed with a different cycle and a point-like defect present within each forbidden band region. This construction enables the point-like defects of the same shape to resonate with different frequencies of light according to the different cycles of the modified refractive index areas.

The wavelength multiplexer/demultiplexer disclosed in Patent Document 1 or 2 introduces or extracts light between the waveguide and the outside through the point-like defect. The Japanese Translation of PCT International Application No. 2001-508887 ("Patent Document 3") discloses a two-dimensional photonic crystal having a point-like defect located between a pair of linear waveguides (see FIGS. 3 and 8 in Patent Document 3). This construction allows a ray of light having frequency equal to the resonant frequency of the point-like defect to be introduced from one waveguide to the other, thus functioning as a multiplexer. It is also possible to use it as a demultiplexer in which a ray of light containing plural frequency components superimposed propagates through one waveguide and a ray of light having a specific frequency is extracted from that light and introduced into the other waveguide.

If the distance between each waveguide and the point-like defect is reduced so that light can be transferred between the two elements, the transfer of light also takes place between the two waveguides. Therefore, in the construction disclosed in Patent Document 3, a ray of light that contains frequency components different from the predetermined frequency is permissible to be transferred at a position different from the point-like defect. This causes the problem of a signal crosstalk.

Though the description thus far has focused on optical multiplexers and demultiplexers, it should be noted that the above-described problem also applies to multiplexers or demultiplexers for electromagnetic waves. Furthermore, optical frequency filters (or wavelength filters) or electromagnetic wave frequency filters that do not use a two-dimensional photonic crystal also suffer from the same problem. In the following description, the term "electromagnetic wave" should be understood as inclusive of light.

The present invention aims to solve the above-described problem, and one of its object is to provide an electromagnetic wave frequency filter capable of efficiently transferring an electromagnetic wave having a predetermined frequency between two waveguides.

DISCLOSURE OF THE INVENTION

In order to solve the above-described problems, the electromagnetic wave frequency filter according to the present invention includes:

a) an input waveguide for propagating an electromagnetic wave;

b) an output waveguide for propagating an electromagnetic wave, which is positioned so that its distance from the input waveguide at a predetermined section along its length is shorter than its distance at the other section; and c) a resonator that resonates with an electromagnetic wave having a predetermined frequency, which is located within the predetermined section between the input waveguide and the output waveguide.

The present electromagnetic wave frequency filter may be constructed using a two-dimensional photonic crystal. In this case, the electromagnetic wave frequency filter includes:

a) a two-dimensional photonic crystal having a slab-shaped body provided with a plurality of modified refractive index areas having a refractive index different from that of the body, which are periodically arranged in the body;

b) an input waveguide formed by creating a linear defect of the modified refractive index areas;

c) an output waveguide formed by creating a linear defect of the modified refractive index areas, which is positioned so that its distance from the input waveguide at a predetermined section along its length is shorter than its distance at the other section; and d) a resonator consisting of a point-like defect that resonates with an electromagnetic wave having a predetermined frequency, which is located within the predetermined section between the input waveguide and the output waveguide.

The present electromagnetic wave frequency filter may be constructed using a two-dimensional photonic crystal having an in-plane heterostructure. In this case, the electromagnetic wave frequency filter includes:

a) a two-dimensional photonic crystal having an in-plane heterostructure, which includes:

a slab-shaped body provided with two or more forbidden band regions; and a plurality of modified refractive index areas having a refractive index different from that of the body, which are periodically arranged within each of the forbidden band regions with a cycle that is differently determined for each of the forbidden band regions;

b) an input waveguide passing through all the forbidden band regions, which is formed by creating a linear defect of the modified refractive index areas within each of the forbidden band regions;

c) an output waveguide formed by creating a linear defect of the modified refractive index areas within each of the forbidden band regions, which is positioned so that its distance from the input waveguide at a predetermined section along its length is shorter than its distance at the other section; and d) a resonator consisting of a point-like defect that resonates with an electromagnetic wave having a predetermined frequency, which is located within the predetermined section between the input waveguide and the output waveguide.

The electromagnetic wave frequency filter using a two-dimensional photonic crystal having an in-plane heterostructure may be preferably constructed so that a portion of the transmission band of the input waveguide in each forbidden band region is outside the transmission band of the input waveguide in all the other forbidden band regions located on one side of the forbidden band region concerned, whereas the same portion is included in the transmission band of the input waveguide in all the other forbidden band regions located on the other side, and the resonant frequency of the resonator located within the forbidden band region concerned is included in the aforementioned portion of the transmission band.

The present invention is elaborated below.

(1) Electromagnetic Wave Frequency Filter According to the Present Invention

The electromagnetic wave frequency filter according to the present invention has a resonator located between the input waveguide and the output waveguide, and the resonator resonates with an electromagnetic wave having a specific frequency component. The present electromagnetic wave frequency filter, which is identical to the frequency filter disclosed in Patent Document 3 in that it has the aforementioned three components, is featured by the positional relationship among the three components. Specifically, the input waveguide and the output waveguide are designed so that the distance between them is minimized at a predetermined section, and the resonator is located between the two waveguides within the predetermined section.

Such a construction has been adopted for the following reason: In the present electromagnetic wave frequency filter, an electromagnetic wave having frequency equal to the resonant frequency of the resonator is transmitted between the input waveguide and the output waveguide through an energy coupling between the input waveguide and the resonator and an energy coupling between the resonator and the output waveguide. To intensify the transmission of the electromagnetic wave, it is desirable to reduce the distance between the input waveguide and the resonator and the distance between the resonator and the output waveguide so that the energy coupling becomes stronger. This suggests that the distance between the input waveguide and the output waveguide should be shorter at the section where the resonator is located. However, a reduction in the distance between the input waveguide and the output waveguide leads to an increase in the strength of the electromagnetic waves directly transmitted without passing through the resonator. This is undesirable because it allows the transmission of electromagnetic waves whose frequency is different from that of the resonator. To avoid such a situation, the distance between the input waveguide and the output waveguide should be adequately large at the other sections except for the one where the resonator is located. To satisfy the two conditions described hereby, the electromagnetic wave frequency filter according to the present invention has adopted the previously described construction.

This construction provides a demultiplexer that extracts an electromagnetic wave having a predetermined frequency from the input waveguide and introduces the wave into the output waveguide. The electromagnetic wave frequency filter having the same construction as that of the aforementioned demultiplexer can be also used as a multiplexer that introduces an electromagnetic wave having the predetermined frequency from the "output waveguide" into the "input waveguide" in terms of the demultiplexer. In this case, the "output waveguide" of the demultiplexer becomes the input waveguide of the multiplexer and the "input waveguide" of the demultiplexer becomes the output waveguide of the multiplexer. It should be noted that the terms "input waveguide" and "output waveguide" used in this specification mean the input and output waveguides of a demultiplexer, unless otherwise specified.

In a typical construction of the input and output waveguides according to the present invention, one or both of the input and output waveguides have an elbow-shaped bend section at a boundary of the aforementioned predetermined section. Alternatively, it is also possible to smoothly curve one or both of the input and output waveguides outside the predetermined section.

The bend section does not always allow the passage of all the electromagnetic waves that pass through the predetermined section of the waveguide. The transmittance of the electromagnetic wave passing through the bend section has a frequency dependency determined by the structure of the bend section, which differs from the frequency dependency of the transmittance of the electromagnetic wave passing through the predetermined section of the waveguide. This characteristic enables the structure of the bend section to be optimized so that it provides a high-transmission band having a transmittance equal to or higher than a predetermined value and including the resonant frequency of the resonator, thereby allowing the electromagnetic wave of that frequency to efficiently pass through the bend section. It is also possible to reduce noises by designing the bend section so that the electromagnetic waves having frequencies different from the predetermined value hardly pass through it.

Furthermore, the present invention allows an end of the output waveguide to be located at a distance from the input waveguide, so that the end of the output waveguide can be located at a desired position. The linear-shaped output waveguide disclosed in Patent Document 3 does not allow such a design.

It is possible to provide multiple output waveguides for one input waveguide. In this case, a resonator is created between the input waveguide and each output waveguide. Each resonator resonates with an electromagnetic wave having a different frequency. Therefore, when the electromagnetic waves propagated through the input waveguide contain plural frequency components superimposed, an electromagnetic wave having a different frequency is transmitted between the input waveguide and each output waveguide. The construction disclosed in Patent Document 3 does not allow the use of multiple output waveguides because the output waveguide extends as a straight line parallel to the input waveguide.

The multiplexing or demultiplexing efficiency can be improved by providing the output waveguide with a reflector on the side where the input/output of the electromagnetic wave does not take place, and by appropriately determining the distance between the resonator and the reflector. For example, the reflector may be created by providing the output waveguide with a terminator or a bend section. The bend section mentioned hereby may be the same as the aforementioned bend section that is created at a boundary of the predetermined section, or it may be provided apart from that.

For a demultiplexer, it is preferable to determine the distance between the resonator and the reflector so that the electromagnetic wave introduced from the resonator into the output waveguide has no phase difference between the electromagnetic wave propagated toward the side opposite to the reflector (i.e. the input/output side) and the electromagnetic wave reflected by the reflector and propagated toward the input/output side. This construction makes the two kinds of electromagnetic waves intensify each other through interference, thereby strengthening the electromagnetic wave extracted. Depending on the construction of the reflector, the electromagnetic wave reflected by the reflector may be accompanied by a phase shift. If the phase is inverted by the reflection, the distance between the resonator and the reflector should be $(2n-1)/4$ times the resonance wavelength, where n is a positive integer hereinafter. If the reflection causes no phase shift, the distance should be $n/2$ times the resonance wavelength.

For a multiplexer, it is preferable to determine the distance between the resonator and the reflector so that the electromagnetic wave propagated from the input waveguide of the multiplexer (i.e. the output waveguide of a demultiplexer) to the resonator has a phase difference of $\pi$ between the electromagnetic wave reflected by the resonator and that reflected by the reflector after passing through the resonator. This construction makes the two kinds of electromagnetic waves weaken each other through interference, thereby strengthening the electromagnetic wave introduced into the resonator. As in the case of the reflector, the electromagnetic wave reflected by the resonator may be accompanied by a phase shift, depending on the construction of the resonator. If the phase of the electromagnetic wave is inverted at the resonator as well as at the reflector, or if the phase remains unchanged at both of them, the distance should be $(2n-1)/4$ times the resonance wavelength. If the phase of the electromagnetic wave is inverted by the reflection at only one of the resonator and the reflector and remains unchanged at the other, the distance should be $n/2$ times the resonance wavelength.

(2) Electromagnetic Wave Frequency Filter According to the Present Invention, Using a Two-Dimensional Photonic Crystal The electromagnetic wave frequency filter described thus far may be constructed using, for example, an electromagnetic wave filter having a dielectric waveguide and a ring resonator. However, it is preferable to use a two-dimensional photonic crystal as described below, because it reduces the loss of electromagnetic waves and also enables the device to have a smaller size.

The electromagnetic wave frequency filter using a two-dimensional photonic crystal according to the present invention includes, as its base member, a two-dimensional photonic crystal whose body consists of a plate-shaped slab with its thickness adequately smaller than its sizes in the in-plane direction, on which modified refractive index areas having a refractive index different from that of the body are periodically arranged. The presence of the periodical arrangement of the modified refractive index areas generates a photonic bandgap in the two-dimensional photonic crystal as the base member, which prevents the presence of electromagnetic waves whose energy falls within the range of the photonic bandgap. This means that the electromagnetic wave having the frequency corresponding to that energy cannot pass through the body. Examples of the material of the body include Si (silicon) and InGaAsP. The modified refractive index area is an area having a refractive index different from that of the body. A typical example is a cylindrical hole disclosed in Patent Document 1. The cylindrical hole can be formed by boring a hole in the body. This process is easier than providing a different material in the body.

In the modified refractive index areas periodically arranged in the body, a defect of modified refractive index areas creates a disorder in the periodicity. If the refractive index, size and/or other parameters of the defect are appropriately determined, a defect level is created within the photonic bandgap, and the electromagnetic wave having the frequency corresponding to the energy equivalent to the defect level is allowed to be present at the defect. Forming a linear defect continuously extending along a line creates a waveguide that propagates electromagnetic waves whose frequency falls within a specific frequency range included in the photonic bandgap. According to the present invention, the input waveguide and the output waveguide are formed so that the distance between them is minimized at a predetermined section.

Within the predetermined section, a point-like defect is created in the modified refractive index areas between the input waveguide and the output waveguide. The point-like defect may be either of the point defect and the cluster defect described previously, and it may be either of the acceptor type and the donor type. An appropriate setting of the type, size, position and other parameter of the point-like defect creates a predetermined defect level in the photonic bandgap. As a result, only the electromagnetic wave having the frequency corresponding to the energy equivalent to the defect level is allowed to resonate at the defect. This means that the defect becomes the resonator.

The above-described construction enables the electromagnetic wave having frequency equal to the resonant frequency of the resonator to be transmitted between the input waveguide and the output waveguide. It also prevents other electromagnetic waves having frequencies different from the resonant frequency from being directly transmitted between the input waveguide and the output waveguide.

To prevent the resonator from leaking electromagnetic waves in the direction perpendicular to the crystal face and causing a loss, it is desirable to construct the resonator as a donor type point-like defect consisting of a defect of the modified refractive index areas.

The distance between the two waveguides can be minimized at a predetermined section by forming a bend section at a boundary of the predetermined section of the input waveguide or the output waveguide. The transmission band of the bend section can be controlled by adjusting one or more of the refractive index, cycle, shape and size of the modified refractive index areas at the bend section. This control enables the bend section to be constructed so that the electromagnetic wave having frequency equal to the resonant frequency of the resonator can easily pass through whereas the other electromagnetic waves having different frequencies hardly pass through. Thus, the bend section reduces noises present in the output waveguide, i.e. the electromagnetic waves having frequencies different from the predetermined value.

Also in the case of using a two-dimensional photonic crystal, the multiplexing or demultiplexing efficiency can be improved as described previously, i.e. by providing the output waveguide with a reflector consisting of a terminator or a bend section located on the side opposite to the input/output side for the electromagnetic waves, and by appropriately determining the distance between the resonator and the reflector. The conditions for determining the distance are also the same as described earlier. It should be noted that the phase of the electromagnetic wave becomes inversed when the electromagnetic wave is reflected by a point-like defect of the two-dimensional photonic crystal. Therefore, in the case of a multiplexer, the determination of the distance between the resonator and the reflector should take into account the phase shift of the electromagnetic wave reflected by the reflector.

As described previously, it is also possible to form multiple output waveguides and provide each output waveguide with a resonator that resonates with an electromagnetic wave having a different frequency so that each electromagnetic wave having a different frequency is transmitted between the input waveguide and each output waveguide.

Some materials have the nature of changing their refractive index when they receive an irradiation of light, an application of pressure or heat, or other external operations. For example, some of the InGaAsP series, InGaAlAsP series or similar types of semiconductors change their charge density and accordingly change their refractive index when a laser beam is irradiated onto them, as a result of the band-filling effect of the quantum well. If the resonator (or point-like defect) is partly or entirely created from such a material, the resonant frequency of the resonator can be varied by controlling the refractive index through an external operation. This enables the electromagnetic wave having a predetermined frequency to be transmitted between the input waveguide and the output waveguide only when the external operation is applied. Conversely, it is possible to forbid the transmission of the electromagnetic wave having a predetermined frequency only when the external operation is applied. These constructions serve as a switch that enables or disables the extraction (from a demultiplexer) or introduction (into a multiplexer) of the electromagnetic wave according to the external operation. Moreover, the frequency of the electromagnetic wave to be transmitted can be controlled by regulating the intensity of the external operation.

It is possible to create multiple output waveguides and provide each resonator with a variable refractive index material described above, whereby the output waveguide to be used for transmitting electromagnetic waves can be selected by applying an external operation. In the case where each of the resonators located in proximity to each of the output waveguides has a different resonant frequency, it is possible to select an output frequency for electromagnetic waves by selecting an output waveguide using the external operation. If the resonators located in proximity to the output waveguides have the same resonant frequency, it is possible to extract an electromagnetic wave having the same frequency from a different output waveguide.

Basically, it is desirable to prevent the resonator from leaking electromagnetic waves in the direction perpendicular to the crystal face because it is a loss, as explained previously. In some cases, however, an intentional leakage of a small amount of electromagnetic waves from the resonator is useful. For example, the intensity of the leaked electromagnetic wave may be measured to determine the strength of the electromagnetic wave transmitted between the input waveguide and the output waveguide.

(3) Electromagnetic Wave Frequency Filter According to the Present Invention, Using a Two-Dimensional Photonic Crystal Having an In-plane Heterostructure Using the two-dimensional photonic crystal having an in-plane heterostructure proposed in Patent Document 2, the electromagnetic wave frequency filter according to the present invention can be constructed as follows: The body is divided into the same number of regions as the multiplexing/demultiplexing frequencies. These regions are called the "forbidden band regions." Within each of the forbidden band regions, modified refractive index areas are periodically arranged with a different cycle to form a common forbidden band region. An input waveguide is formed by creating a linear defect of the modified refractive index areas continuously extending along a line passing through all the forbidden band regions. Within each forbidden band region, an output waveguide is created, which is formed so that its distance from the input waveguide is minimized at a predetermined section. A point-like defect (resonator) is created within the aforementioned predetermined section between the input waveguide and each output waveguide. The point-like defect may be preferably a donor type point-like defect, as explained earlier. The resonant frequency depends on the arrangement cycle of the modified refractive index areas. Therefore, in the case of a demultiplexer, the frequency of the electromagnetic wave introduced into each output waveguide can be controlled by setting a different arrangement cycle of the modified refractive index for each forbidden band region.

Furthermore, it is preferable to arrange the forbidden band regions in an ascending or descending order of the resonant frequencies along the direction of the electromagnetic waves propagated through the input waveguide. In the case the forbidden band regions are arranged in the ascending order, the arrangement cycle of the modified refractive index areas should be smaller in that order. Conversely, if the forbidden band regions are arranged in the descending order, the arrangement cycle of the modified refractive index areas should be larger in that order. This construction enables the transmission band to be controlled so that a portion of the transmission band of the input waveguide in a given forbidden band region is outside the transmission band of an adjacent forbidden band regions located on the side to which the superimposed waves are propagated. Within each forbidden band region, a resonator whose resonant frequency is included in the aforementioned portion of the transmission band is located. If this construction is applied to a demultiplexer, the electromagnetic wave that corresponds to the resonant frequency of a point-like defect but has passed by the point-like defect without being introduced into it is totally reflected at the boundary with the adjacent forbidden band region and returns to the point-like defect. As a result, the percentage of the electromagnetic waves introduced through this resonator into the output waveguide becomes higher and the demultiplexing efficiency is improved. The efficiency of a multiplexer can be also improved in a similar manner.

Also in the two-dimensional photonic crystal having an in-plane heterostructure, the multiplexing or demultiplexing efficiency can be improved as described previously, i.e. by providing the output waveguide with a reflector on the side opposite to the input/output side for the electromagnetic waves, and by appropriately determining the distance between the resonator and the reflector. The conditions for determining the distance are also the same as described earlier. The reflector in the present case may be a terminator or a bend section of the output waveguide. Alternatively, the boundary with the adjacent forbidden band region that does not pass the electromagnetic wave having frequency equal to the resonant frequency of the resonator concerned may be used as the reflector by extending the output waveguide to the boundary.

The following two constructions are also applicable to the electromagnetic wave frequency filter using a two-dimensional photonic crystal having an in-plane heterostructure:

(1) Use of a material whose refractive index changes according to an external operation to enable or disable the extraction or introduction of electromagnetic waves from and into output waveguides; and (2) Detection of electromagnetic waves leaking from the resonator to determine the intensity of the electromagnetic wave transmitted between the input waveguide and the output waveguide.

According to the present invention, it is possible to transmit the electromagnetic wave having a predetermined frequency between the input waveguide and the output waveguide via a resonator with a high level of efficiency by making the distance between the input waveguide and the output waveguide shorter within a predetermined section in which the resonator is located and longer outside the same section. Other electromagnetic waves having different frequencies are prevented from being transmitted between the two waveguides. The present invention allows an end of the output waveguide to be located at a distance from the input waveguide. Therefore, the end of the output waveguide can be located at a desired position, and the electromagnetic wave having a predetermined frequency can be extracted from a desired position.

Preferably, the electromagnetic wave frequency filter should be constructed using a two-dimensional photonic crystal. Use of a donor type point-like defect as the resonator is particularly preferable because it prevents the electromagnetic wave from leaking from the resonator and being lost when they are transmitted between the input waveguide and the output waveguide. Also, use of a two-dimensional photonic crystal having an in-plane heterostructure enables the electromagnetic wave propagated through the input waveguide to be reflected at a boundary of the forbidden band region, whereby the intensity of the electromagnetic wave introduced into the resonator is increased and the transmission efficiency between the input waveguide and the output waveguide is improved.

BEST MODE FOR CARRYING OUT THE INTENVION

Figure 1:
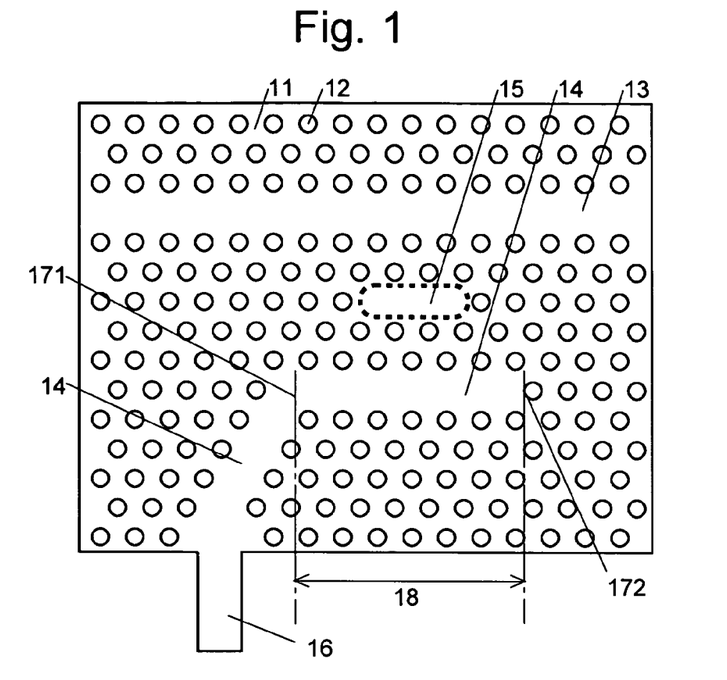
FIG. 1 is a schematic diagram of an electromagnetic wave frequency filter using a two-dimensional photonic crystal as an embodiment of the electromagnetic wave frequency filter according to the present invention.

As an embodiment of the electromagnetic wave frequency filter according to the present invention, FIG. 1 shows an example of the construction of an electromagnetic wave (light) frequency filter using a two-dimensional photonic crystal. It includes a body 11 provided with holes 12 periodically arranged in a triangular lattice pattern as the modified refractive index areas. A linear region devoid of the holes 12 is formed as the input waveguide 13. Similarly, another linear region devoid of the holes 12 is created as the output waveguide 14 so that it extends parallel to the input waveguide 13 within a predetermined section 18 and deviates from the input waveguide 13 within the other section. An external waveguide 16 is connected to an end of the output waveguide 14. For example, the external waveguide 16 is a wire waveguide made of the same material as that of the body 11. At the other end of the output waveguide 14, a terminator 172 is created by the presence of the holes 12 (or by not providing a defect of the holes 12). The terminator 172 corresponds to an end of the predetermined section 18. Located at the other end of the predetermined section 18 is a bend section 171 of the output waveguide 14. A point-like defect 15 is formed within the predetermined section 18 between the input waveguide 13 and the output waveguide 14. The present case uses a donor type cluster defect formed by the absence of three holes located on a straight line.

Figure 2:
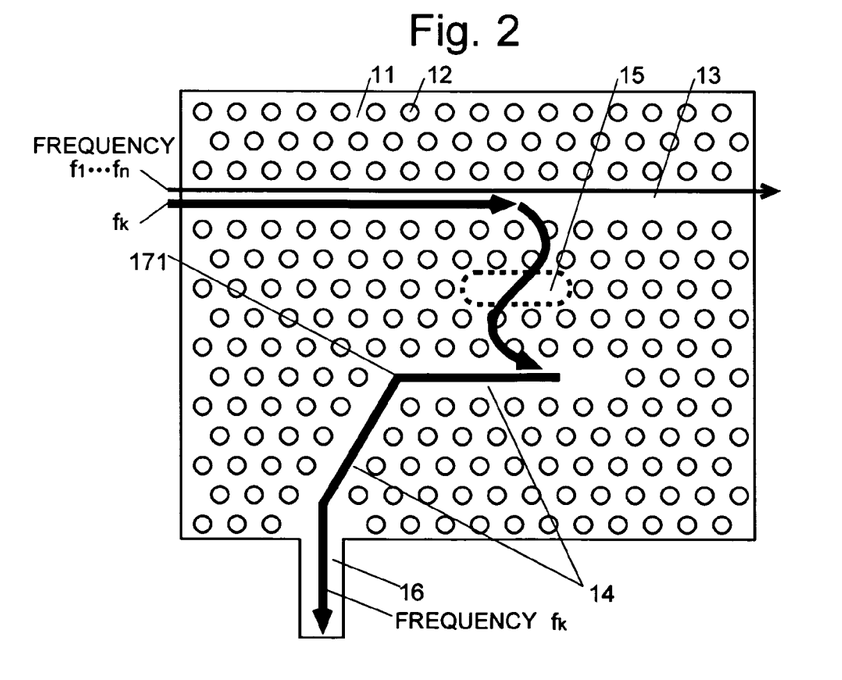
FIG. 2 is a diagram showing an electromagnetic wave being demultiplexed in the electromagnetic wave frequency filter of FIG. 1.

The operation of the electromagnetic wave frequency filter of FIG. 1 is described with reference to FIG. 2. The input waveguide 13 propagates electromagnetic waves containing plural frequency components $f_1, f_2, \ldots, f_n$ superimposed. From these electromagnetic waves, the electromagnetic wave having frequency equal to the resonant frequency $f_k$ of the point-like defect 15 is introduced through the point-like defect 15 into the output waveguide 14. The electromagnetic wave introduced into the output waveguide 14 is extracted through the bend section 171 to the external waveguide 16.

In this construction, the output waveguide 14 is located far from the input waveguide 13 within the section other than the predetermined section 18, whereby the electromagnetic wave components whose frequencies differ from the predetermined frequency are prevented from being transmitted between the two waveguides. Also, the use of a donor type point-like defect as the point-like defect 15 prevents the electromagnetic wave from leaking from the face of the two-dimensional photonic crystal and being lost.

Figure 3:
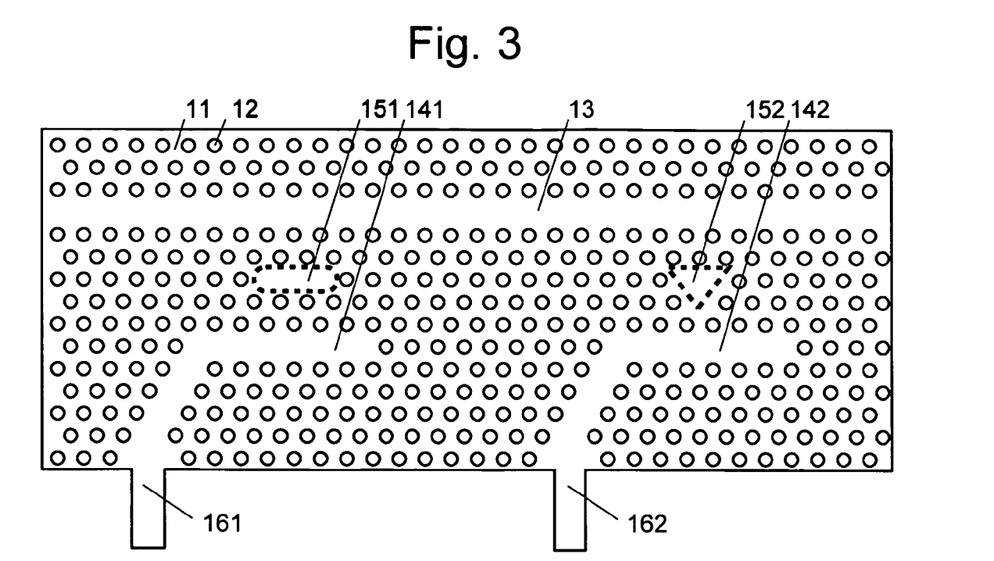
FIG. 3 is a schematic diagram showing an embodiment of the electromagnetic wave frequency filter using a two-dimensional photonic crystal, which extracts or introduces plural components of electromagnetic waves having different frequencies.

FIG. 3 shows another example of the construction of the electromagnetic wave frequency filter using a two-dimensional photonic crystal. Similar to the electromagnetic wave frequency filter of FIG. 1, the photonic crystal has a body 11 provided with holes 12 and a input waveguide 13. In addition, the body 11 has multiple output waveguides (141, 142, . . . ) to which external waveguides 161, 162, . . . are connected, respectively. Point-like defects 151, 152, . . . having different resonant frequencies are located between the input waveguide 13 and the output waveguides 141, 142, . . . , respectively. In the present example, the point-like defect 151 is a donor type cluster defect consisting of three defects located on a straight line and the point-like defect 152 is a donor type cluster defect consisting of three defects arranged like a triangle. FIG. 3 shows only two sets of output waveguides, external waveguides and point-like defects. It is possible to provide more than two sets in a similar manner.

In this construction, the input waveguide 13 propagates electromagnetic waves containing plural frequency components $f_1, f_2, \ldots, f_n$ superimposed, from which the electromagnetic waves having frequencies equal to the resonant frequencies of the point defects 151, 152, . . . are introduced through these point-like defects into the output waveguides 141, 142, . . . . This construction serves as an electromagnetic wave frequency filter that extracts plural electromagnetic waves having different frequencies to the output waveguides.

Figure 4:
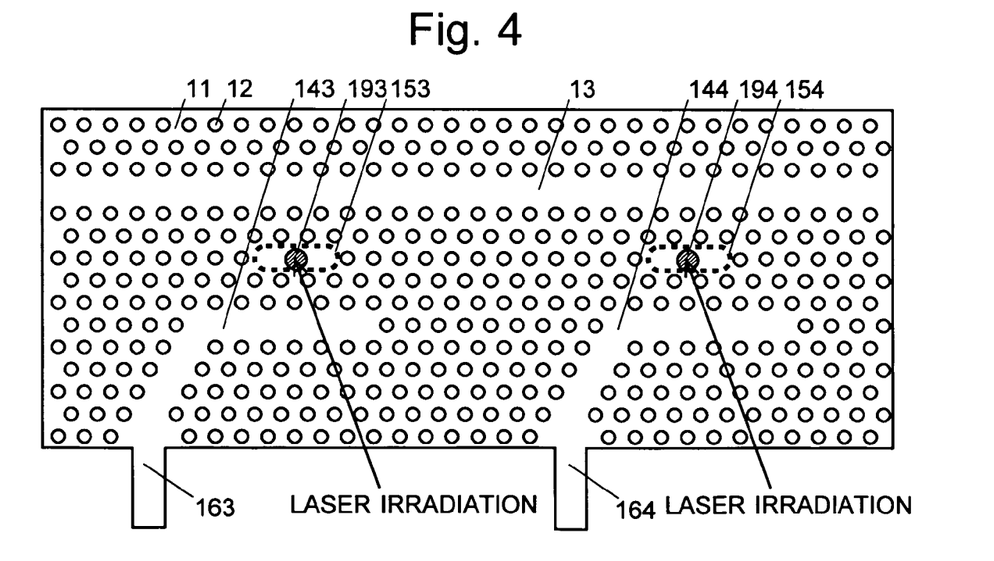
FIG. 4 is a schematic diagram showing an embodiment of the electromagnetic wave frequency filter using a two-dimensional photonic crystal, which has a switching function for sending an electromagnetic wave having a predetermined frequency to a desired output waveguide.

FIG. 4 shows another example of the construction of the electromagnetic wave frequency filter using a two-dimensional photonic crystal. Similar to the electromagnetic wave frequency filter of FIG. 3, it has a body 11, holes 12, an input waveguide 13, multiple output waveguides (143, 144, . . . ), and external waveguides (162, 164, . . . ). In the present example, identical point-like defects 153, 154, . . . are located between the input waveguide 13 and the output waveguides 143, 144, . . . , and the same variable refractive index material 193, 194, . . . is embedded in each point-like defect. Each material is made of InGaAsP series or InGaAlAsP series whose refractive index changes when a laser beam is irradiated on it.

The resonant frequency of the point-like defects 153 and 154 varies depending on the presence of the irradiation of a laser beam; it is $f_1$ when no laser beam is irradiated on the variable refractive index material or $f_1'$ when the laser beam is irradiated on the variable refractive index material. Irradiating the laser beam on one of the variable refractive index materials 193, 194, . . . enables the electromagnetic wave having frequency $f_1'$ and propagating the input waveguide 13 to be extracted to a desired external waveguide 163, 164, . . . . For example, if the electromagnetic wave having frequency $f_1'$ is to be extracted to the external waveguide 164, the laser beam should be irradiated on the variable refractive index material 194. Then, the electromagnetic wave having frequency $f_1'$ and propagating through the input waveguide 13 passes by the point-like defect 153 without entering the output waveguide 143 because the resonant frequency $f_1$ of the point-like defect 153 does not match the frequency of the electromagnetic wave. In contrast, at the point-like defect 154, the electromagnetic wave is introduced into the output waveguide 144 and extracted to the desired external waveguide 164 because the resonant frequency of the point-like defect 154 matches the frequency of the electromagnetic wave. Thus, the point-like defects 153, 154, . . . with the variable refractive index materials embedded serve as switches that operate upon receiving an irradiation of a laser beam.

Figure 5:
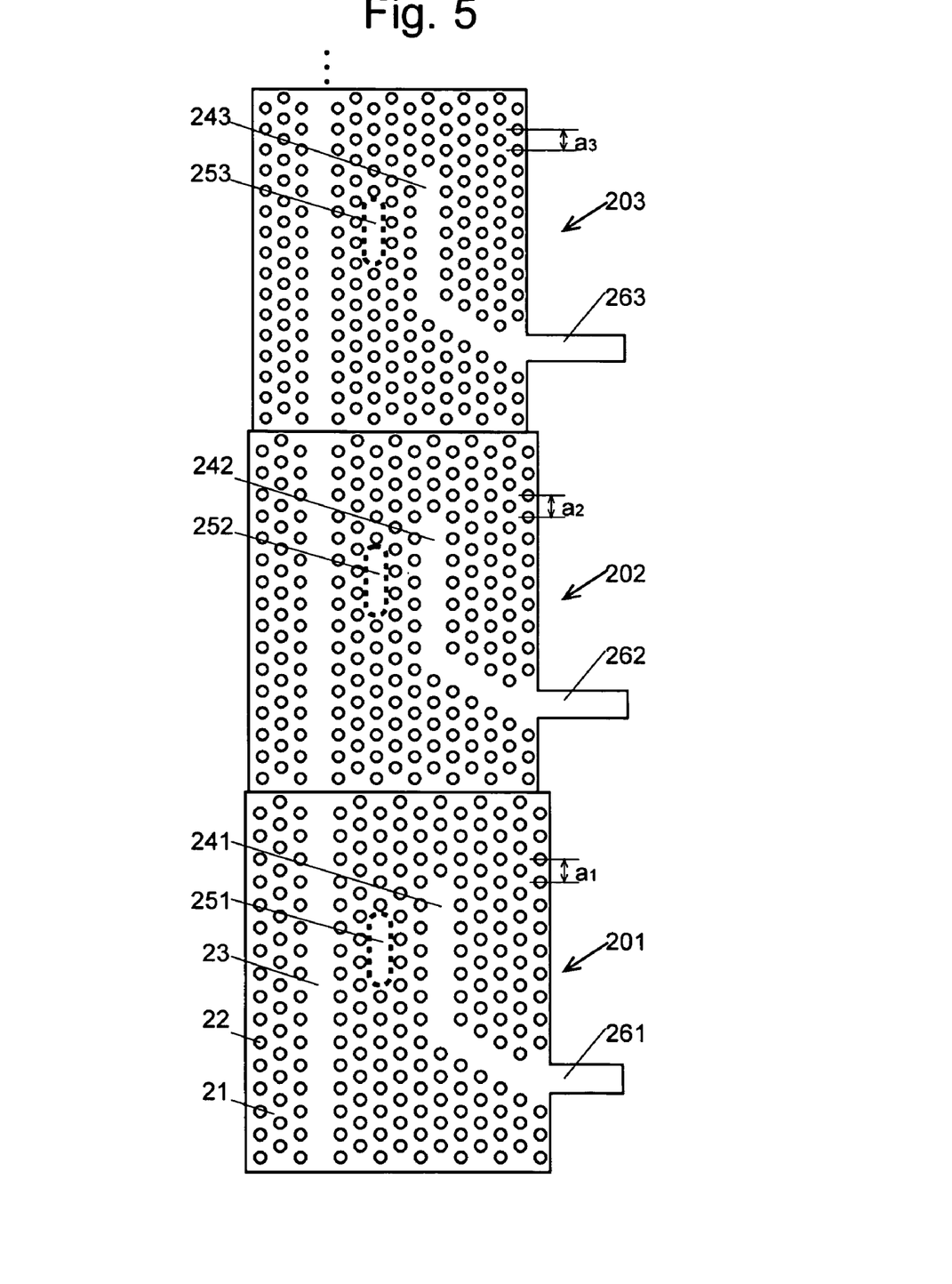
FIG. 5 is a schematic diagram showing an example of the construction of the electromagnetic wave frequency filter using a two-dimensional photonic crystal having an in-plane heterostructure as an embodiment of the electromagnetic wave frequency filter according to the present invention.

FIG. 5 shows an example of the construction of the electromagnetic wave frequency filter using a two-dimensional photonic crystal having an in-plane heterostructure. The body 21 is divided into plural regions (i.e. the forbidden band regions), and holes 22 are formed with a different arrangement cycle $a_1$, $a_2$ or $a_3$ within each region. The present example shows three forbidden band regions 201, 202 and 203. It is also possible to have more forbidden band regions located above on FIG. 5. The arrangement cycle values $a_1, a_2, a_3, \ldots$ of the holes 22 in the forbidden band regions satisfy $a_1 > a_2 > a_3, \ldots$ . An input waveguide 23 is formed so that it passes through all the forbidden band regions. Within each forbidden band region, output waveguides 241, 242, 243, . . . , point-like defects 251, 252, 253, . . . , and external waveguides 261, 262, 263, . . . are formed. Each of the output waveguides 241, 242, 243, . . . has a bend section, as in the electromagnetic wave frequency filter of FIG. 1. Each point-like defect is a donor type cluster defect consisting of three defects located on a straight line.

Figure 6:
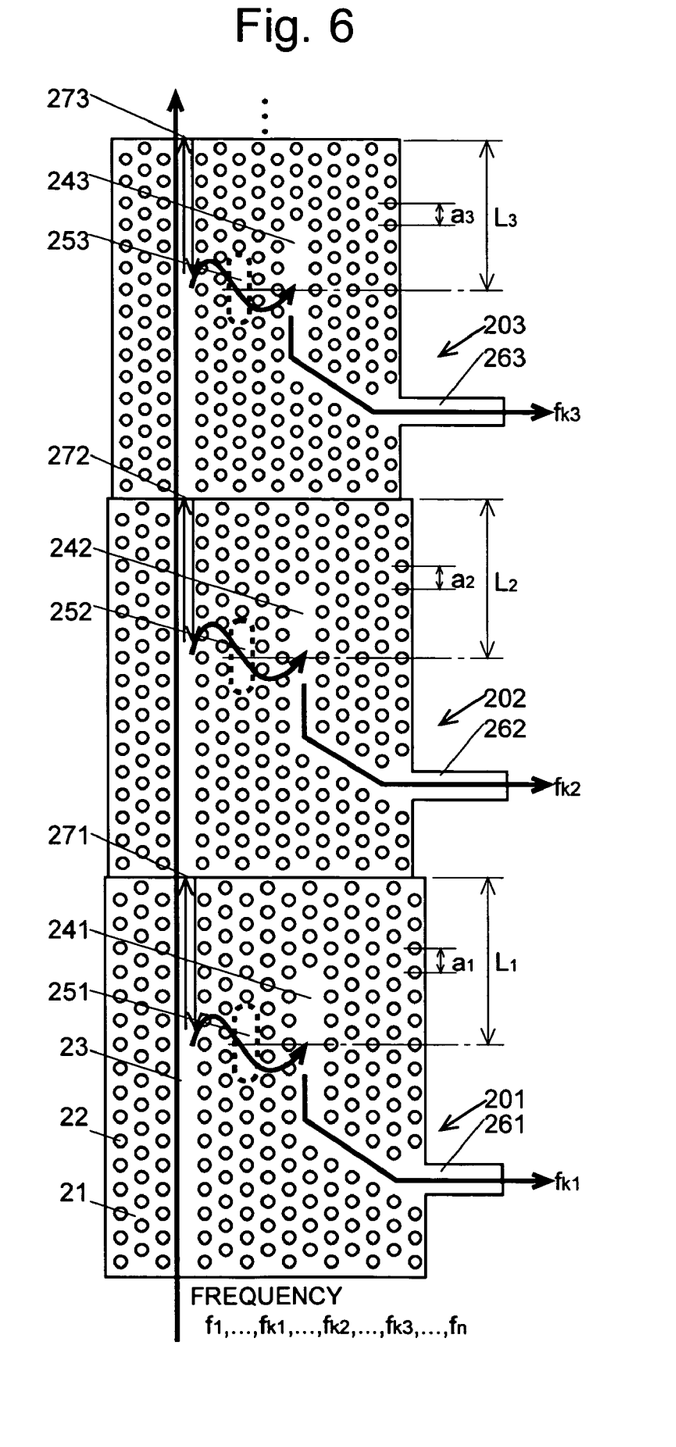
FIG. 6 is a diagram showing an electromagnetic wave being demultiplexed in the electromagnetic wave frequency filter of FIG. 5.

The operation of the electromagnetic wave frequency filter of FIG. 5 is described with reference to FIG. 6. The input waveguide 23 propagates electromagnetic waves containing plural frequency components $f_1, f_2, \ldots, f_n$ superimposed, from which the electromagnetic wave having frequency equal to the resonant frequency $f_{k1}$ of the point-like defect 251 is introduced through the point-like defect 251 into the output waveguide 241. Similarly, the electromagnetic waves having frequencies equal to the resonant frequencies $f_{k2}, f_{k3}$ . . . of the point-like defects 252, 253, . . . are introduced through these point-like defects 252, 253, . . . into the output waveguides 242, 243, . . . , respectively. The electromagnetic wave introduced into each output waveguide is extracted to the external waveguide connected to the output waveguide.

Use of a donor type point-like defect prevents the loss of the electromagnetic waves to the outside of the crystal face, as in the electromagnetic wave frequency filter of FIG. 1. The use of the donor type cluster defect consisting of three defects located on a straight line is particularly preferable in the case where the reflection of the electromagnetic wave at the boundary with a forbidden band region is to be utilized, as described later.

Figure 7:
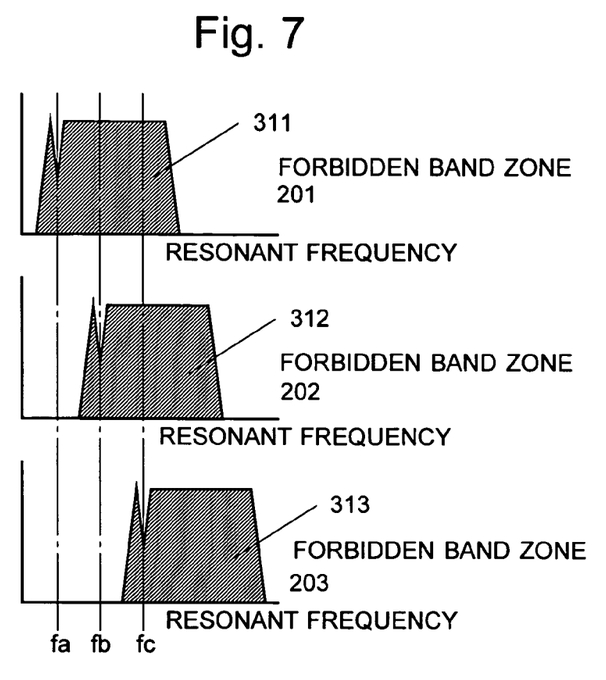
FIG. 7 is a schematic diagram showing how the forbidden band regions in the electromagnetic wave frequency filter of FIG. 5 relate to each other in respect of the transmission band of the input waveguide and the resonant frequencies.

In the two-dimensional photonic crystal having an in-plane heterostructure, the frequency band in which the electromagnetic waves can propagate through the input waveguide 23 differs from one forbidden band region to another, depending on the arrangement cycle of the holes 32. Therefore, as shown in FIG. 7, if the electromagnetic wave having frequency $f_a$ is included in an end section of the frequency band 311 in which waves are allowed to propagate through the input waveguide in the forbidden band region 201, the same electromagnetic wave is outside the frequency band 312 of the input waveguide in the forbidden band region 202. In this case, the electromagnetic wave having frequency $f_a$ and propagating through the input waveguide in the forbidden band region 201 is reflected at the boundary 271 between the forbidden band regions 201 and 202. Now, suppose that the resonant frequency of the point-like defect 251 is $f_a$. Even if an electromagnetic wave having frequency $f_a$ and propagating through the input waveguide passes by the point-like defect 251 without entering it, the same wave is subsequently reflected at the boundary 271. Due to this reflection, the intensity of the electromagnetic wave having frequency $f_a$ that is introduced through the point-like defect 251 into the output waveguide 241 becomes higher than in the case where there is no reflection. The above-described condition is satisfied if the resonant frequency is within an end section of the frequency band of the input waveguide. Use of the aforementioned donor type cluster defect consisting of three defects located on a straight line satisfies that condition.

One of the factors that weaken the electromagnetic wave introduced into the output waveguide is the reflection of the electromagnetic wave by the point-like defect. If the phase of the electromagnetic wave is inverted by the reflection at the boundary 271, 272, 273, . . . , the distance $L_1, L_2, L_3, \ldots$ between the point-like defect 251, 252, 253, . . . and the boundary 271, 272, 273, . . . , should be $(2n-1)/2$ times the resonant frequency of the point-like defect. This construction causes the electromagnetic wave reflected by the boundary 271, 272, 273, . . . and that reflected by the point-like defect 251, 252, 253, . . . to weaken each other through interference. As a result, the electromagnetic wave introduced into the output waveguide is further strengthened.

Figure 8:
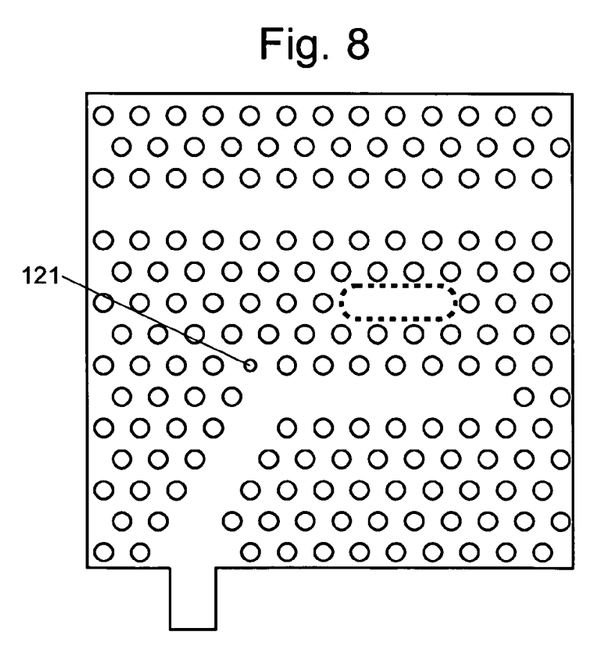
FIG. 8 is a schematic diagram showing an example of regulating a parameter of the hole at the bend section of the output waveguide.
Figure 9A:
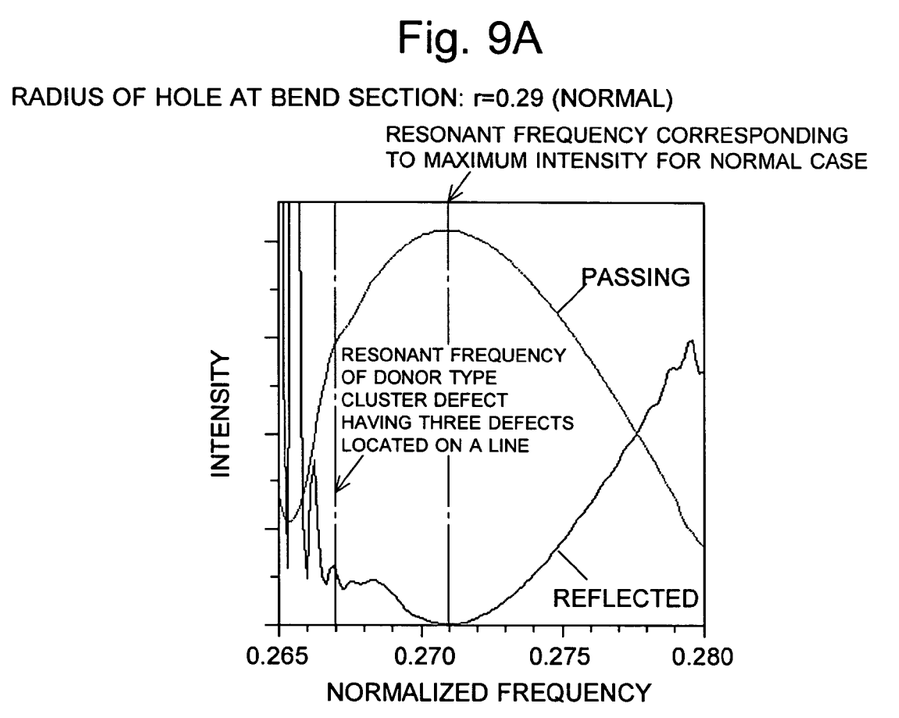
FIGS. 9A and 9B are graphs showing the result of calculating the transmittance at the band sections of the output waveguides shown in FIGS. 1 and 8, respectively.
Figure 9B:
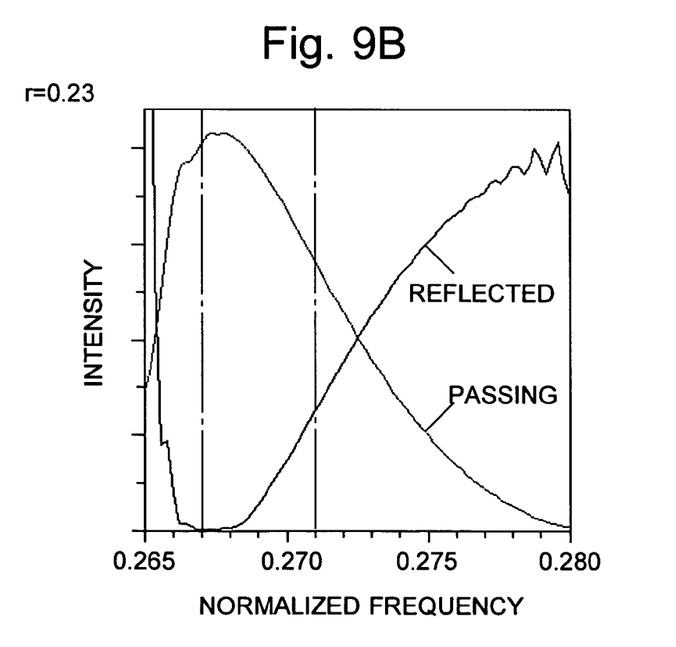

The entirety of the electromagnetic waves passing through the predetermined section of the output waveguide (e.g. the numeral 141 in FIG. 1) does not always pass through the bend section (e.g. the numeral 171 in FIG. 1). It is possible to control the frequency dependency of the transmittance of the electromagnetic wave at the bend section by regulating the arrangement cycle, shape and size of the holes 12 located in proximity to the bend section. FIGS. 8, 9A and 9B show an example. In FIG. 8, the diameter of the hole 121, which is located at the outer corner of the bend section 171 of the output waveguide shown in FIG. 1, is smaller than that of the other holes. FIGS. 9A and 9B show the result of calculating the transmission and reflection spectra, using the FDTD (Finite Difference Time Domain) method. FIG. 9A corresponds to the case where the parameters relating to the holes belonging to the bend section are equal to those of the other holes (as in FIG. 1), and FIG. 9B corresponds to the case shown in FIG. 8. In the calculation for FIG. 9B, the diameter of the hole 121 shown in FIG. 8 is 0.23a and that of the other holes 12 is 0.29a, where a is the arrangement cycle of the holes 12. The change in the diameter of the hole at the bend section causes a shift of the normalized frequency corresponding to the maximum transmittance from 0.271 (FIG. 9A) to 0.267 (FIG. 9B), where the normalized frequency is a dimensionless value obtained by multiplying the frequency with a/c, with c being the speed of light. This shift makes the frequency match the (normalized) resonant frequency 0.267 of the aforementioned donor type cluster defect consisting of three defects located on a straight line, so that the electromagnetic wave having the predetermined frequency can efficiently pass through the bend section.

In the example of FIG. 8, the resonant frequency of the resonator and the frequency corresponding to the maximum transmittance of the bend section are both proportional to the arrangement cycle a. Therefore, once the resonator and the bend section have been designed for one resonant frequency, it is easy to regulate the arrangement cycle a for the other resonant frequencies so that the frequency corresponding to the maximum transmittance of each bend section matches the resonant frequency of each resonator. This is particularly useful in the case of using a heterostructure because it eliminates the necessity of designing the bend section for each modified refractive index area. Such a control is also applicable to the case of regulating another parameter of the hole 12 located in proximity to the bend section.

Figure 10A:
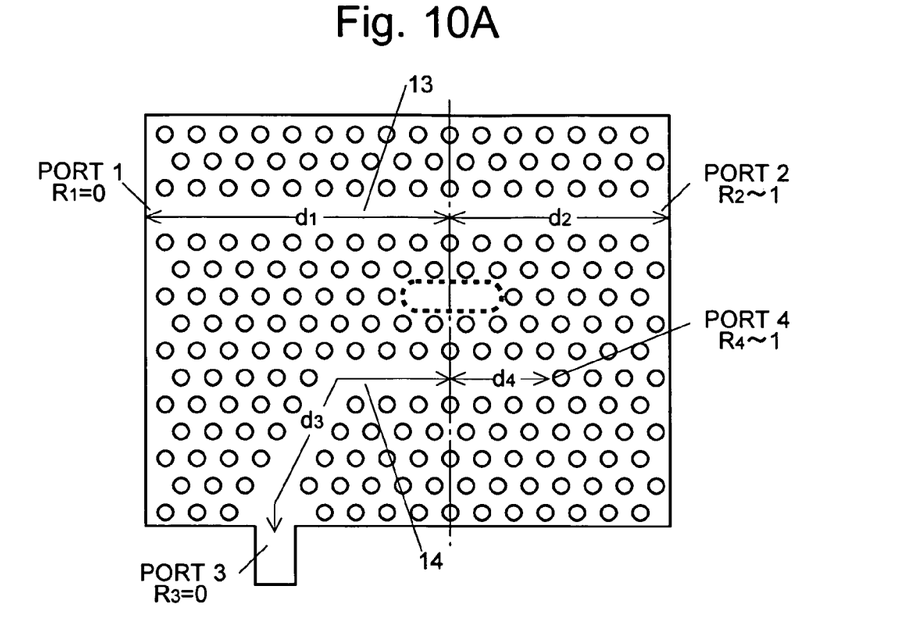
FIG. 10 is a graph showing the result of calculating the intensity of an electromagnetic wave having frequency equal to the resonant frequency of the resonator observed at the end of each waveguide, which depends on the distance between the output waveguide and the resonator.
Figure 10B:
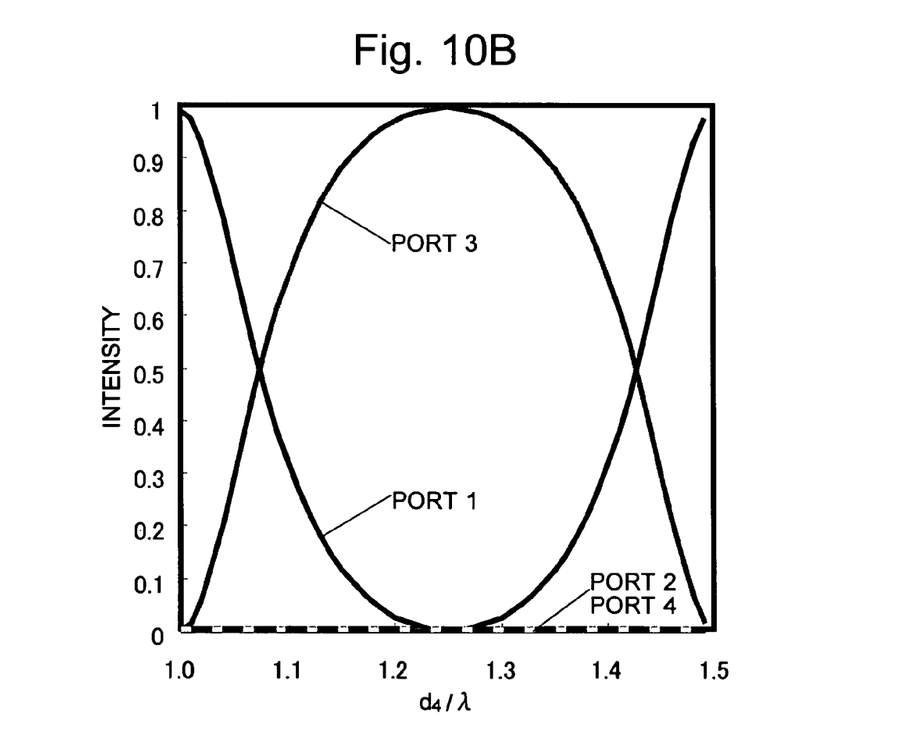

In the case a terminator is formed at one end of the output waveguide, the efficiency of transmitting electromagnetic waves from the other end to the outside depends on the distance between the terminator and the resonator. Regarding this matter, a calculation is conducted using the example of FIG. 10A. In this example, an end of the input waveguide 13 is called "port 1", and the other end "port 2." The end of the output waveguide 14 at which the input/output of electromagnetic waves takes place is called "port 3", and the terminator "port 4." The reflectance is zero at port 1 and port 3. The reflectance at port 2 is 1 due to, for example, the presence of a modified refractive index area adjacent to the port. The reflectance at port 4, the terminator of the output waveguide, is 1. Each of the distances $d_1$, $d_2$ and $d_3$ between the resonator and the ports 1, 2, and 3 is $(2n-1)/4$ times the resonance wavelength, where n is a positive integer. FIG. 10B shows the result of calculating the intensity of the electromagnetic wave having frequency equal to the resonant frequency of the resonator observed at each port under the condition that the distance $d_4$ between port 4 and the resonator is varied within the range of 1 to 1.5 times the resonance wavelength. FIG. 10B shows that, when the distance $d_4$ is 1.25 times the resonance wavelength, the entirety of the electromagnetic wave having frequency equal to the resonant frequency of the resonator is sent to port 3. This corresponds to the case where the distance between the end of the output waveguide and the resonator is $(2n-1)/4$ times the resonance wavelength, where n is a positive integer.

What is claimed is:

1. An electromagnetic wave frequency filter, comprising:
   a) a two-dimensional photonic crystal having a slab-shaped body provided with a plurality of modified refractive index areas having a refractive index different from that of the body, which are periodically arranged in the body;
   b) an input waveguide defined by a linear defect of the modified refractive index areas;
   c) an output waveguide defined by a linear defect of the modified refractive index areas, which is positioned so that its distance from the input waveguide at a predetermined section along its length is shorter than its distance at another section; and
   d) a resonator consisting of a point-like defect that resonates with an electromagnetic wave having a predetermined frequency, which is located within the predetermined section between the input waveguide and the output waveguide.

2. The electromagnetic wave frequency filter according to claim 1, wherein the point-like defect is a donor type point-like defect defined by a defect of the modified refractive index areas.

3. The electromagnetic wave frequency filter according to claim 1, wherein at least one of the resonators is partly or entirely created from a material whose refractive index changes due to an external operation.

4. The electromagnetic wave frequency filter according to claim 1, wherein the output waveguide is provided with a reflector for reflecting the electromagnetic wave having frequency equal to the resonant frequency of the resonator, and the distance between the resonator and the reflector is determined so that a phase distance between the electromagnetic wave reflected by the resonator and the electromagnetic wave reflected by the reflector is $\pi$.

5. The electromagnetic wave frequency filter according to claim 1, wherein at least one resonator radiates a portion of the electromagnetic wave resonating.

6. The electromagnetic wave frequency filter according to claim 1, comprising: multiple output waveguides; and
   multiple resonators, each of which is located within a predetermined section between the input waveguide and each output waveguide and resonates with an electromagnetic wave having a predetermined frequency.

7. The electromagnetic wave frequency filter according to claim 6, wherein each of the resonators corresponding to each of the output waveguides has a different resonant frequency.

8. The electromagnetic wave frequency filter according to claim 1, wherein one or both of the input waveguide and the output waveguide has a bend section at an end of the predetermined section.

9. The electromagnetic wave frequency filter according to claim 8, wherein the resonant frequency of the resonator is included in a high-transmission band of the bend section.

10. The electromagnetic wave frequency filter according to claim 9, wherein the modified index area at the bend section differs from the other modified index areas in one or more of its refractive index, cycle, shape and size.

11. The electromagnetic wave frequency filter according to claim 1, wherein the output waveguide is provided with a reflector for reflecting the electromagnetic wave having frequency equal to the resonant frequency of the resonator, and the distance between the resonator and the reflector is determined so that a phase distance between the electromagnetic wave introduced from the resonator into the output waveguide and the electromagnetic wave reflected by the reflector is zero.

12. The electromagnetic wave frequency filter according to claim 11, wherein the reflector consists of one of the following parts: an end of the output waveguide; a bend section formed at an end of the predetermined section; an end section formed at a position outside the predetermined section; and a boundary of an adjacent forbidden band region located on said one side.

13. An electromagnetic wave frequency filter, comprising:
    a) a two-dimensional photonic crystal having an in-plane heterostructure, which includes:
       a slab-shaped body provided with two or more forbidden band regions; and
       a plurality of modified refractive index areas having a refractive index different from that of the body, which are periodically arranged within each of the forbidden band regions with a cycle that is differently determined for each of the forbidden band regions;
    b) an input waveguide passing through all the forbidden band regions defined by a linear defect of the modified refractive index areas within each of the forbidden band regions;
    c) an output waveguide defined by a linear defect of the modified refractive index areas within each of the forbidden band regions, which is positioned so that its distance from the input waveguide at a predetermined section along its length is shorter than its distance at another section; and
    d) a resonator consisting of a point-like defect that resonates with an electromagnetic wave having a predetermined frequency, which is located between the input waveguide and the output waveguide within the predetermined section.

14. The electromagnetic wave frequency filter according to claim 13, wherein the point-like defect is a donor type point-like defect defined by a defect of the modified refractive index areas.

15. The electromagnetic wave frequency filter according to claim 13, wherein a portion of a transmission band of the input waveguide in each forbidden band region is outside a transmission band of the input waveguide in all the other forbidden band regions located on one side of the forbidden band region concerned, whereas the same portion is included in the transmission band of the input waveguide in all the other forbidden band regions on the other side, and the resonant frequency of the resonator located within the forbidden band region concerned is included in the aforementioned portion of the transmission band.

16. The electromagnetic wave frequency filter according to claim 15, wherein, for each forbidden band region, the distance between the resonator belonging to the forbidden band region and a boundary with an adjacent forbidden band region located on said one side is determined so that a phase difference between an electromagnetic wave having frequency equal to the resonant frequency of the resonator of the forbidden band region concerned and being reflected by the resonator and an electromagnetic wave having the same frequency and being reflected by the boundary of the forbidden band region after passing by the resonator is $\pi$.

17. The electromagnetic wave frequency filter according to claim 12, wherein the point-like defect is a donor type cluster defect defined by three defects of three modified index areas located on a straight line.

* * * * *

UNITED STATES PATENT AND TRADEMARK OFFICE
CERTIFICATE OF CORRECTION

| | | |
|---|---|---|
| PATENT NO. | : 7,184,638 B2 | Page 1 of 1 |
| APPLICATION NO. | : 10/540776 | |
| DATED | : February 27, 2007 | |
| INVENTOR(S) | : Susumu Noda, Takashi Asano and Hitomichi Takano | |

It is certified that error appears in the above-identified patent and that said Letters Patent is hereby corrected as shown below:

On the Title Page
Please delete the following:

Item (73)   Assignees: Agency of Industrial Science and Technology, Saitama (JP); Matsushita Electric Works, Ltd., Osaka (JP)

and replace with:

Item (73)   Assignees: Japan Science and Technology Agency, Saitama (JP); Matsushita Electric Works, Ltd., Osaka (JP)

Signed and Sealed this

Tenth Day of July, 2007

JON W. DUDAS
*Director of the United States Patent and Trademark Office*